United States Patent
Fukue et al.

[11] Patent Number: 6,099,253
[45] Date of Patent: Aug. 8, 2000

[54] GAS TURBINE ROTOR BLADE

[75] Inventors: Ichiro Fukue; Eiji Akita; Kiyoshi Suenaga; Yasuoki Tomita, all of Takasago, Japan

[73] Assignee: Mitsubishi Heavy Industries, Inc., Tokyo, Japan

[21] Appl. No.: 09/203,680

[22] Filed: Dec. 1, 1998

[30] Foreign Application Priority Data

Jan. 13, 1998 [JP] Japan .................................. 10-004778

[51] Int. Cl.[7] ...................................................... F01D 5/18
[52] U.S. Cl. ......................... 416/97 R; 416/191; 416/192
[58] Field of Search .................................. 415/115, 116; 416/96 R, 96 A, 97 R, 97 A, 189–192

[56] References Cited

U.S. PATENT DOCUMENTS

| 3,164,367 | 1/1965 | Lynch ..................................... 416/97 R |
| 4,127,358 | 11/1978 | Parkes . |
| 5,460,486 | 10/1995 | Evans et al. . |
| 5,482,435 | 1/1996 | Dorris et al. . |
| 5,779,447 | 7/1998 | Tomita et al. ......................... 416/97 R |
| 5,785,496 | 7/1998 | Tomita . |

FOREIGN PATENT DOCUMENTS

| 58-47104 | 3/1983 | Japan ................................ 416/189 R |
| 2-23201 | 1/1990 | Japan ..................................... 416/96 A |
| 2-211332 | 8/1990 | Japan ......................................... 415/115 |
| 2132703 | 7/1984 | United Kingdom ................. 416/97 R |
| 1605335 | 12/1991 | United Kingdom . |
| 96/13654 | 5/1996 | WIPO . |

OTHER PUBLICATIONS

Patent Abstracts of Japan, vol. 1996, No. 12, Dec. 26, 1996.

*Primary Examiner*—Christopher Verdier
*Attorney, Agent, or Firm*—Wenderoth, Lind & Ponack, L.L.P.

[57] ABSTRACT

A gas turbine rotor blade has a plurality of first cooling holes for the flow of a cooling gas bored in a blade portion along its lengthwise direction and a plurality of second cooling holes for flow of the cooling gas bored in a shroud along its plane direction so as to communicate with the first cooling holes, and is constructed such that the cooling gas can flow in a uniform distribution. The plurality of the first cooling holes 3 for flow of the cooling gas are bored in the blade portion 2 and the plurality of the second cooling holes 5 for flow of the cooling gas are bored in the shroud 1 along its plane direction. The second cooling holes 5 communicate with the first cooling holes 3, hole to hole, via two-step holes 4, and the second cooling holes 5 are bored alternately on the dorsal side and the ventral side of the rotor blade.

6 Claims, 2 Drawing Sheets

Rotational axis

GAS TURBINE ROTOR BLADE

BACKGROUND OF THE INVENTION

1. Field of the Invention

The present invention relates to a rotor blade of a gas turbine used for a thermal power plant, etc., and more specifically to a rotor blade of a gas turbine in which a plurality of cooling holes are bored for the flow of a cooling gas.

2. Description of the Prior Art

FIG. 2 shows a prior art rotor blade of a gas turbine used for a thermal power plant, etc. This rotor blade is called an integral shroud blade and there is formed a shroud 11 integrally with a blade portion 12 at a tip of the blade portion 12.

The shroud 11 serves to reduce the amount of gas leaking from the tip portion of the blade portion 12 as well as to enhance the vibration resistance strength of the blade portion 12 as an end face of the shroud 11 is pressure-welded to an end face of a shroud 11 of another adjacent blade so as to form a series of grouped blades. If a two-directional vibration in a rotation-axial direction and a circumferential direction occurs at the blade portion 12, the end face of the shroud 11 is formed inclined and the adjacent shrouds are pressure-welded together at the inclined end faces, and thus the two-directional vibration is suppressed.

Also, in order to reduce the amount of gas leaking from the tip portion of the blade portion 12 as well as to prevent the shroud 11 from coming into contact with a casing side, there is provided a fin 17 to the shroud 11 by cutting.

In this type of gas turbine rotor blade, in order to correspond to a high temperature gas, there are provided a multiplicity of cooling holes 13 so as to carry out convection cooling in the blade portion 12. Further, the shroud 11 is made thinner so that its plane forms a shape like a ray fish.

Also, in the shroud 11, there is framed along the tip portion of the blade portion 12 a two-step groove 14 of a shape such that a groove is formed so as to communicate with the cooling holes 13. A plurality of cooling holes 15 for cooling the shroud 11 are bored from an end portion of the shroud 11 toward the two-step groove 14 along a face direction of the shroud 11.

In boring the cooling holes 15 in the shroud 11, the two-step groove 14 is formed in advance in the shroud along outlets of the cooling holes 13 of the blade portion 12. The cooling holes 15 are bored toward the two-step groove 14 in the shroud 11, and then an upper groove of the two-step groove 14 is covered by a plate-like plug 16. This plug 16 is inserted into the upper groove of the two-step groove 14 to a depth so as not to plug the cooling holes 15 of the shroud 11, and is then fixed by welding or the like around its periphery.

A cooling gas flows through the cooling holes 13 to cool the blade portion 12, flows through the cooling holes 15 to cool the shroud 11, and then flows out of the end portion of the shroud 11. As the cooling holes 13 of the blade portion 12 so communicate with the cooling holes 15 of the shroud 11, the cooling gas is efficiently consumed. Also, because the two-step groove 14 is formed in the shroud 11, working of the cooling holes 15 in the shroud 11 is facilitated.

As mentioned above, the present gas turbine rotor blade is alleviated in weight of the shroud 11, thus a remarkably small stress is acting centrifugally on a root portion of the shroud 11 so that the life of the rotor blade is elongated. Also, the cooling gas which has flown through the cooling holes 13 of the blade portion 12 flows through the cooling holes 15 of the shroud 11 and is discharged, and thus the shroud 11 is well cooled so as to reduce a temperature of the shroud 11, and the life of the rotor blade is further elongated.

Also, in boring the plurality of cooling holes 15 in the shroud 11, the two-step groove 14 is formed in advance along outlets of the cooling holes 13 of the blade portion 12 The work is done merely by boring the cooling holes 15 toward the two-step groove 14 in the shroud 11, and hence the boring of the cooling holes 15 is facilitated.

As mentioned, there are various advantages in the present gas turbine rotor blade. However, with respect to the consumption of cooling gas which has a small influence on gas turbine performance, the cooling gas flows out of each of the first cooling holes 13 to join together in the two-step groove 14, and then flows into each of the second cooling holes 15 bored toward both side faces of the shroud 11.

Accordingly, corresponding to a difference in a resistance of each of the second cooling holes 15 which communicate with the two-step groove 14, a difference in flow rate of the cooling gas which flows in each of the cooling holes 15 occurs resulting in portion of a difference in cooling effect, so that a uniform distribution control cannot be effected.

SUMMARY OF THE INVENTION

It is therefore an object of the present invention to provide a gas turbine rotor blade comprising a plurality of first cooling holes for flow of a cooling gas bored in a blade portion along a lengthwise direction thereof and a plurality of second cooling holes for flow of the cooling gas bored in a shroud along a plane direction thereof so as to communicate with the first cooling holes, constructed such that the cooling gas can flow in a uniform distribution.

In order to attain the object, the present invention provides a gas turbine rotor blade comprising a plurality of first cooling holes for flow of a cooling gas bored in a blade portion along a lengthwise direction thereof and a plurality of second cooling holes for flow of the cooling gas bored in a shroud along a plane direction thereof so as to communicate with the first cooling holes. The second cooling holes communicate with the first cooling holes, hole to hole, and the second cooling holes are bored alternately on a dorsal side and a ventral side of the rotor blade.

According to the gas turbine rotor blade of the present invention as so constructed, the cooling gas, which has flown through the first cooling holes of the blade portion, flow uniformly through the plurality of second cooling holes which communicate with the first cooling holes, one hole to one hole. They are bored alternately on the dorsal side and the ventral side of a tip of the rotor blade along the plane direction of the shroud.

Accordingly, the cooling gas flows through the first cooling holes bored in the blade portion to be regulated in flow rate and to cool the blade portion, and then flows through the second cooling holes, which communicate with the first cooling holes, hole to hole, and are bored in the shroud, to cool the shroud, and thus the temperature of the shroud lowers uniformly.

In the gas turbine rotor blade of the present invention, the construction is preferably such that the second cooling holes communicate with the first cooling holes via a plurality of holes, each bored in the shroud along the lengthwise direction of the blade portion and engraved in two steps in each of the first cooling holes with an upper step portion thereof being covered by a plug.

By employing such construction, in case the second cooling holes are to be bored in the shroud, the work is done merely such that each of the second cooling holes is bored in the shroud toward each of the holes engraved in two steps in the first cooling holes, and then the upper step of each of the holes is covered by a plug. Thus, the engraving of the holes and the boring of the second cooling holes are facilitated as with the work of the conventional rotor blade.

BRIEF DESCRIPTION OF THE DRAWINGS

FIG. 1 are views showing a gas turbine rotor blade of an embodiment according to the present invention, wherein

FIG. 2 are views showing a prior art gas turbine rotor blade, wherein

DESCRIPTION OF THE PREFERRED EMBODIMENTS

Figure 1A:
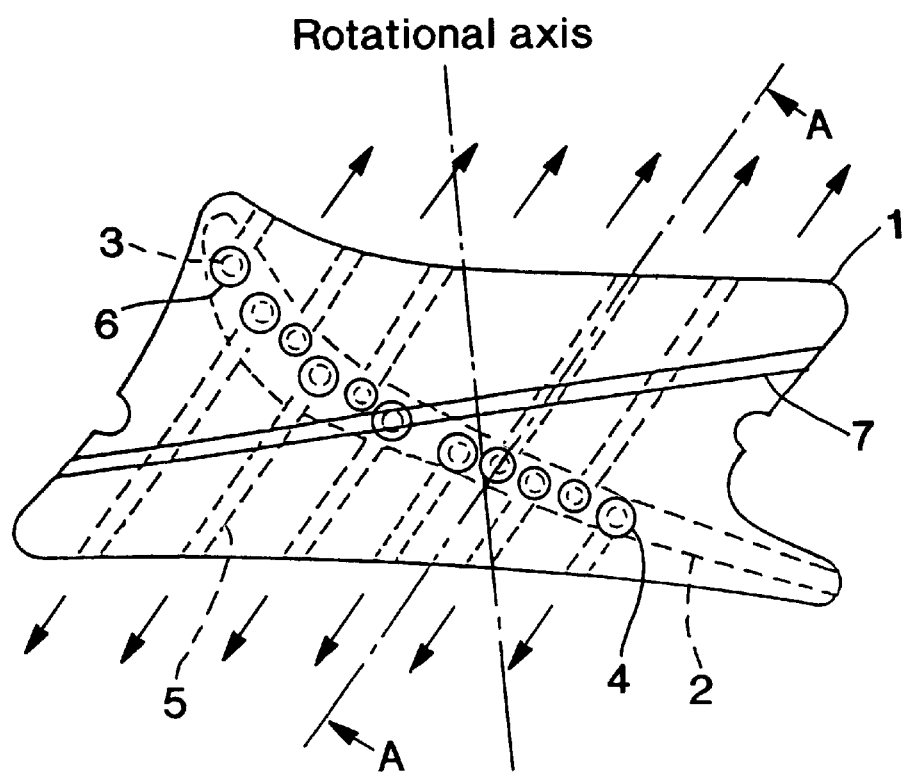
FIG. 1(a) is a plan view and FIG. 1(b) is a cross sectional view taken on line A-A of FIG. 1(a).
Figure 1B:
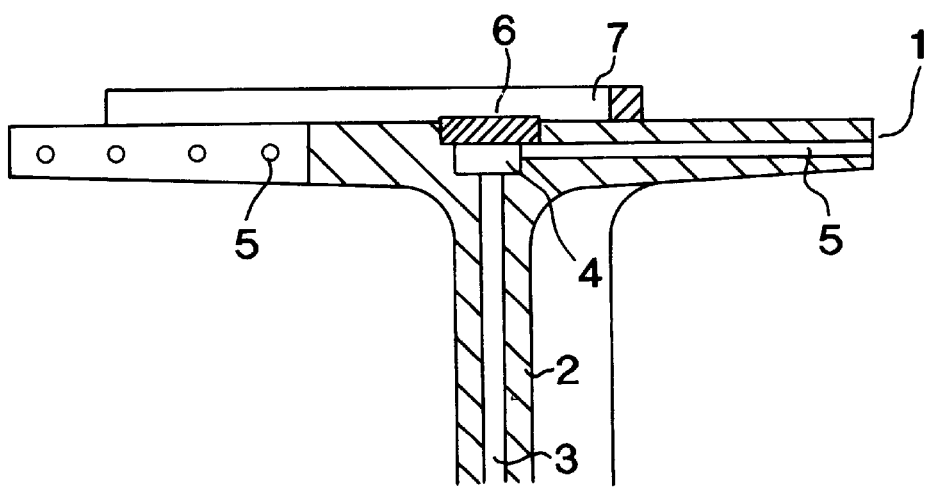

Herebelow, description is made concretely on an embodiment of a gas turbine rotor blade according to the present invention with reference to FIG. 1. The rotor blade shown in FIG. 1, like that shown in FIG. 2, is of a type called an integral shroud blade in which there is formed a shroud 1 integrally with a blade portion 2 at a tip of the blade portion 2.

Figure 2A:
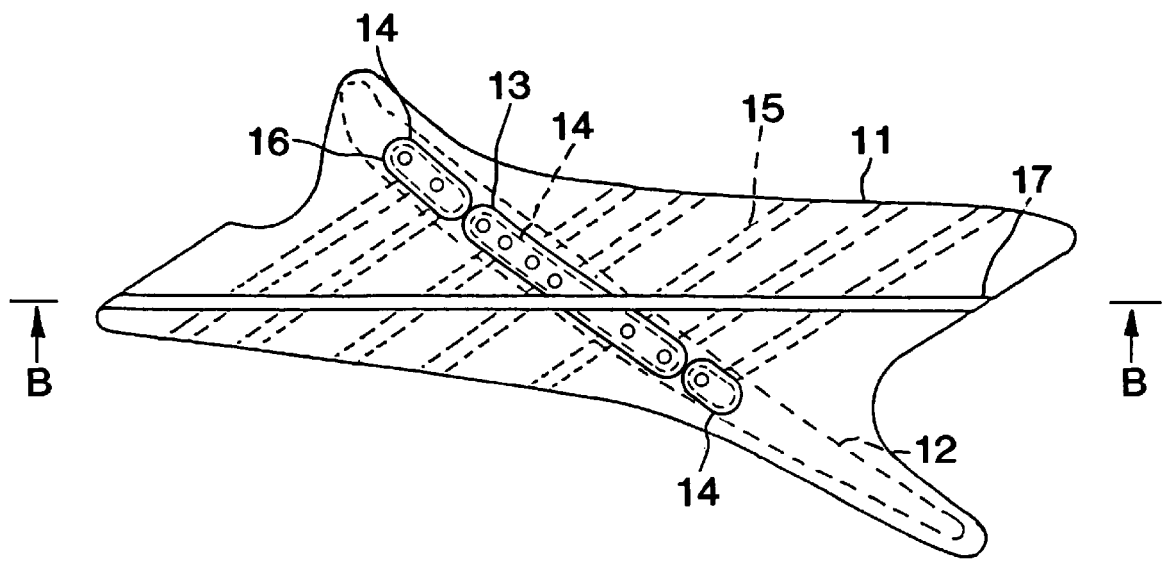
FIG. 2(a) is a plane view and FIG. 2(b) is a cross sectional view taken on line B-B of FIG. 2(a).
Figure 2B:
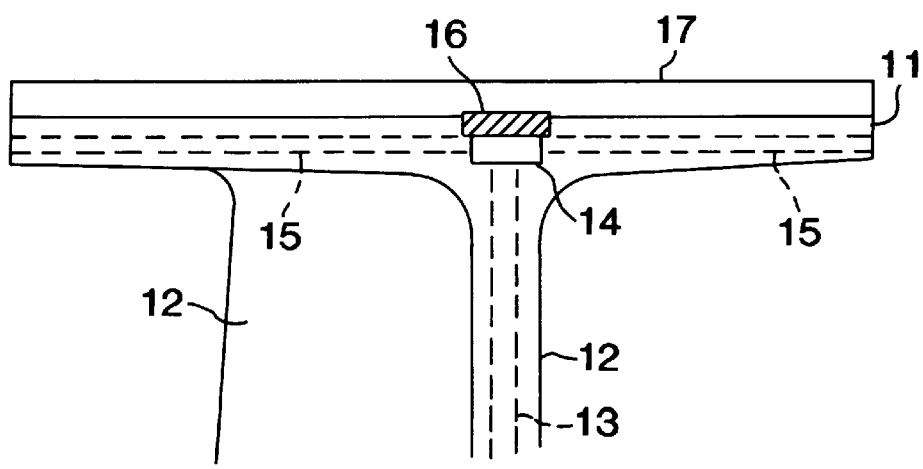

In this gas turbine rotor blade, like that shown in FIG. 2, in order to correspond to a high temperature gas, there are provided a multiplicity of cooling holes 3 for carrying out a convection cooling in the blade portion 2. Further, the shroud 1 is made thin so that its plane forms a shape like a ray fish.

In the shroud 1, there are engraved a plurality of two-step holes 4, each having a shape such that a hole is engraved further in a hole, so as to communicate with the cooling holes 3, hole to hole. A plurality of cooling holes 5 for cooling the shroud 1 are bored toward the two-step holes 4 so as to communicate hole to hole, from a respective side end portion of the shroud 1 and alternately on a dorsal side and a ventral side of the blade.

In boring the cooling holes 5 in the shroud 1, each of the plurality of two-step holes 4 is engraved in advance at an outlet of each of the cooling holes 3 of the blade portion 2 and each of the cooling holes 5 is bored toward each of the two-step holes 4 in the shroud 1. Then an upper hole of each of the two-step holes is covered by a plug 6.

The plug 6 is inserted into the upper hole each of the two-step holes 4 to a depth so as not to plug the cooling hole 5 of the shroud 1. It is fixed by welding or the like around its periphery. Reference numeral 7 designates a fin for a contact prevention.

The cooling gas flows through the cooling holes 3 to cool the blade portion 2 and then further flows through the cooling holes 5 to cool the shroud 1. It is then discharged from the side end portion of the shroud 1. As the cooling holes 3 of the blade portion 2 so communicate with the cooling holes 5 of the shroud 1, hole to hole, the cooling gas is efficiently consumed.

Also, as the two-step holes 4 are engraved in the shroud 1, working of the cooling holes 5 in the shroud 1 is facilitated.

By use of such construction, the first cooling holes 3 bored in the blade portion along its lengthwise direction and the second cooling holes 5 bored in the shroud along its plane direction alternately on the dorsal side and the ventral side of the rotor blade are communicated with each other, hole to hole, each via one of the two-step holes 4 covered by respective plug 6. Accordingly feeding of the cooling gas becomes regulatable and the shroud can be cooled uniformly.

Incidentally, regulation of the flow rate of the cooling gas is individually done at an inlet portion of the cooling holes 3.

According to the gas turbine rotor blade of the present invention as described above, as the construction is such that the cooling holes bored in the blade portion along its lengthwise direction and the cooling holes bored in the shroud along its plane direction alternately on the dorsal side and the ventral side of the rotor blade are communicated with each other, hole to hole, the flow rate of the cooling gas can be regulated individually and the temperature of the shroud can be lowered uniformly. Accordingly, the life of the gas turbine rotor blade is elongated remarkably.

Also, in the gas turbine rotor blade of the present invention, there is employed a construction such that the first cooling holes and the second cooling holes are communicated with each other, hole to hole, each via one of the holes engraved in two steps in each of the first cooling holes and covered by the plug. Accordingly working of the first cooling holes bored in the blade portion and the second cooling holes bored in the shroud is facilitated.

It is understood that the invention is not limited to the particular construction and arrangement herein illustrated and described, but embraces such modified forms thereof as come within the scope of the following claims.

What is claimed is:

1. A gas turbine rotor blade comprising;
   a blade portion having a lengthwise direction, a dorsal side and a ventral side;
   a shroud portion at an end of said blade portion, said shroud portion having a planar direction thereof and dorsal and ventral sides corresponding to said dorsal side and said ventral side of said blade portion, respectively;
   a plurality of first cooling holes for the flow of cooling gas bored in said blade portion in the lengthwise direction thereof, and a plurality of second cooling holes for the flow of cooling gas bored in said shroud along the planar direction thereof, said second cooling holes fluidly communicating with respective ones of said plurality of first cooling holes with a one hole to one hole relationship;
   wherein said plurality of second cooling holes alternate position on said dorsal side and said ventral side of said shroud.

2. The gas turbine rotor of claim 1, wherein said plurality of second cooling holes communicate with said plurality of first cooling holes through a plurality of third holes bored in said shroud in the lengthwise direction of said blade portion, each of said third holes comprising two steps including an upper step portion that is covered by a plug.

3. The gas turbine rotor of claim 1, wherein said second cooling holes are parallel to each other.

4. The gas turbine rotor of claim 1, wherein said shroud portion has an outer surface, an inner surface and a side surface between said outer surface and said inner surface, said plurality of second cooling holes opening onto said side surface.

5. The gas turbine rotor of claim 1, wherein said plurality of first cooling holes and said plurality of second cooling holes form respective individual cooling passages that extend from said blade portion and through said shroud portion and that are Out of communication with each other along their extent.

6. The gas turbine rotor of claim 1, wherein said one hole to one hole relationship is defined such that each of said plurality of first cooling holes is in fluid communication with one and only one of said plurality of second cooling holes.

* * * * *